J. & H. CLARK.
SAP GATHERING TANK.
APPLICATION FILED SEPT. 11, 1909.
967,499.
Patented Aug. 16, 1910.
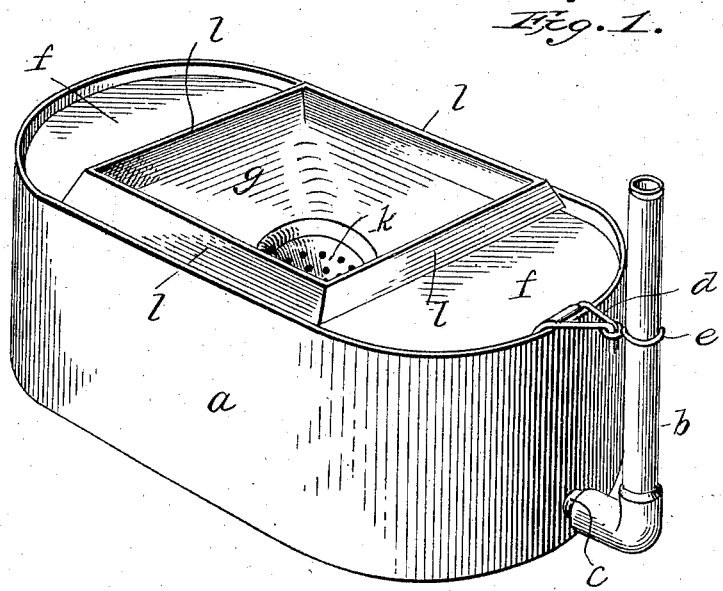
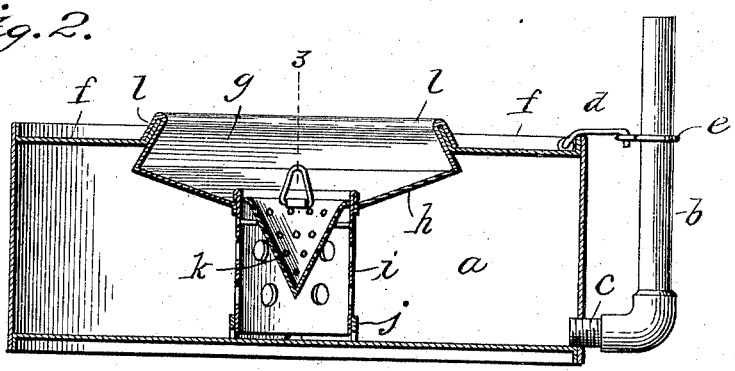
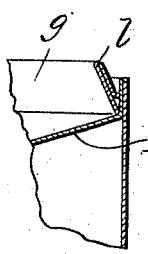

UNITED STATES PATENT OFFICE.

JOSEPH CLARK AND HENRY CLARK, OF RICHFORD, VERMONT.

SAP-GATHERING TANK.

967,499.  Specification of Letters Patent.  Patented Aug. 16, 1910.

Application filed September 11, 1909. Serial No. 517,244.

*To all whom it may concern:*

Be it known that we, JOSEPH CLARK and HENRY CLARK, of the town of Richford, county of Franklin, State of Vermont, have invented certain new and useful Improvements in Sap-Gathering Tanks, of which the following is a full and clear description, reference being had to the accompanying drawings, in which—

Figure 1 is a perspective view of a tank constructed in accordance with our invention; Fig. 2 a vertical longitudinal sectional view of the same; and Fig. 3 a fragmentary vertical sectional view of a portion of the side wall of the tank and its hopper.

The object of this invention is to improve and simplify that class of portable tanks especially adapted for transporting sap from the sugar orchard to the boiling place, the special object of our present construction being to prevent the sap slopping over both while it is being poured into the tank from the sap buckets in the orchard and also while it is being transported from the orchard to the boiler as more fully hereinafter set forth.

Referring to the drawings by reference-characters, $a$ designates the main portion of the tank which is preferably oblong in shape and is provided at one end with a spout $b$ screwed to a nipple $c$ attached to the tank so as to adapt it to be turned down to a horizontal position when the sap is to be drawn off and run into the boiler. A suitable hook $d$ is pivoted to the top edge of the tank and is adapted to detachably connect with an eye in a ring $e$ attached to the spout, to hold the spout temporarily in an upright position.

The two sections $f$ of the top wall proper of the tank extend inwardly from the ends thereof about one-fourth the length of the tank, and between the inner edges of these sections $f$ and the side walls of the tank is mounted a hopper designated generally by the letter $g$. The bottom wall $h$ of this hopper inclines downwardly and inwardly to a central opening down through which is inserted a removable tube $i$ open at both ends and suitably perforated, the lower end of this tube being held by an annular flange on the bottom of the tank and its upper end held in place by the edge of the hopper-opening. Set down in the open end of this tube is a depending conical strainer $k$ which is adapted to be readily removed. This strainer catches the solid foreign matters, and the tube $i$ serves to prevent the splashing of the sap from dislodging the strainer. The outer edges of the bottom wall $h$ are extended upwardly on all four sides to form the side walls $l$ of the hopper $g$, these side walls being fastened to the adjacent edges of the top or cover sections $f$ and also to the opposite side walls of the main tank. These side walls are also extended upwardly above the top walls of the tank and are inclined upwardly toward each other, so that each of these side walls of the hopper overhangs the bottom wall proper $h$ of the hopper.

It will be observed that a hopper constructed as shown and described prevents the sap splashing or slopping over in any direction when it is poured into the hopper from the sap buckets, so that the sap gatherer may pour the sap into the hopper from any point and without taking special pains to avoid wasting the sap by slopping over the edges of the hopper guards $l$. These guards $l$ also prevent sap splashing out when the tank is being transported to the boiler and the tank is sufficiently full to have its level lie up in the hopper.

Having thus fully described our invention, what we claim as new and desire to secure by Letters Patent, is—

1. A sap gathering tank of the class set forth having its top wall extending inwardly from its ends a portion of the length of the tank and a hopper formed between the ends of said top walls and the side walls of the tank and connected thereto all around, said hopper having a bottom inclining downwardly and inwardly from the sides as well as the ends and also guard flanges or walls at its edge extending all around its edge and upwardly above the top wall of the tank and inclining toward each other so as to overhang the bottom of the hopper, a splash tube depending from a central opening in the hopper bottom, and a removable screen in said splash tube.

2. A sap gathering tank of the class set forth having its top wall extending inwardly from its ends a portion of the length of the tank and a hopper formed between the ends of said top walls and the side walls of the tank, said hopper having a bottom inclining downwardly and inwardly from the sides as well as the ends and also guard flanges or walls at its edge extending all around its edge and upwardly above the top wall of the tank and inclining toward each other so as to overhang the bottom of the hopper, said guard flanges or walls being supported and attached to the side walls and the inner edges of the end portions of the top wall and being constructed of sheet metal folded upon itself to form a two-ply flange, and a strainer supported within the central opening of the hopper.

In testimony whereof, we have signed this specification in the presence of two subscribing witnesses.

JOSEPH CLARK.
HENRY CLARK.

Witnesses:
WALLACE B. LOCKLIN,
PHILIP LOCKLIN.